US011895754B1

(12) United States Patent
Hayes et al.

(10) Patent No.: US 11,895,754 B1
(45) Date of Patent: Feb. 6, 2024

(54) DUAL-MODE PRESSURE-SENSING ILLUMINATION MAT

(71) Applicant: ZEBRA TECHNOLOGIES CORPORATION, Lincolnshire, IL (US)

(72) Inventors: Matthew B. Hayes, Wheaton, IL (US); Andrea Mirabile, London (GB); Charles Burton Swope, Coral Springs, FL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/072,447

(22) Filed: Nov. 30, 2022

(51) Int. Cl.
*H05B 47/115* (2020.01)
*H05B 45/10* (2020.01)

(52) U.S. Cl.
CPC ........... *H05B 47/115* (2020.01); *H05B 45/10* (2020.01)

(58) Field of Classification Search
CPC . G01L 1/205; G01L 1/22; G01L 1/225; G01L 5/101; G06Q 10/087; G06Q 20/20; G06Q 20/203; G06Q 30/0261; G06Q 30/0283; G06Q 30/0627; G06Q 30/0629; G06Q 30/0631; G06Q 30/0633; G06Q 30/0639; G06Q 30/0641; G06Q 30/0643; G06Q 30/0277; G06Q 30/06; G06Q 30/0226; G06Q 10/06375; G06Q 30/00; G06Q 30/0267; G06Q 10/00; G06Q 30/0234; B65G 1/0457; H02J 2207/50; H02J 2300/26; H02J 3/46; H02J 7/345; H04W 4/02; G06V 20/52; G06T 7/70; G06T 7/80; H05B 47/115; H05B 45/10
See application file for complete search history.

(56) References Cited

U.S. PATENT DOCUMENTS

2017/0124603 A1* 5/2017 Olson ...................... H04L 67/52
2017/0337535 A1* 11/2017 Jones .................... B67D 1/0412
2022/0374970 A1* 11/2022 Bronicki ............ G06Q 30/0633

* cited by examiner

*Primary Examiner* — Monica C King

(57) ABSTRACT

Systems and apparatuses for dual-mode pressure-sensing and illumination mats are provided. The systems include a surface that includes a plurality of row wires and a plurality of column wires forming intersection points. At the intersection points, the systems include a pressure sensor configured to sense a pressure exerted upon the surface and a light emitting diode (LED) connected in parallel. The systems include a controller coupled to the selector and configured to control operation of the surface, wherein the controller is configured to operate in one of a pressure-sensing mode or an illumination mode. When the controller is configured to operate in the pressure-sensing mode, the controller scans pressure values provided by the pressure sensors. When the controller is configured to operate in the illumination mode, the controller configures the surface to enable the LEDs in accordance with an illumination pattern.

20 Claims, 8 Drawing Sheets

$$178$$
$$\begin{pmatrix} 255, & 255, & 255, & 0, & 0, & 255, & 255, & 255, \\ 255, & 255, & 255, & 0, & 0, & 255, & 255, & 255, \\ 255, & 255, & 255, & 0, & 0, & 255, & 255, & 255, \\ 0, & 0, & 0, & 0, & 0, & 0, & 0, & 0, \\ 255, & 255, & 255, & 255, & 255, & 255, & 255, & 255, \\ 255, & 255, & 255, & 255, & 255, & 255, & 255, & 255, \\ 255, & 255, & 255, & 255, & 255, & 255, & 255, & 255, \end{pmatrix}$$

1

DUAL-MODE PRESSURE-SENSING ILLUMINATION MAT

BACKGROUND

Frictionless checkout systems typically rely on cameras positioned throughout the venue to detect which items to associate with shoppers. For example, if a shopper picks a product off a shelf, the frictionless checkout system may add the product to an inventory of items associated with the shopper. As a result, when the frictionless checkout system detects that the shopper has left the venue, the system may automatically process the purchase of any items in the shopper's inventory.

To detect when shoppers pick items off venue shelves, venue operators may deploy pressure mats configured to sense a change in pressure. These pressure mats conventionally include an array of pressure sensors to more precisely detect a location associated with the change in pressure. As a result, the frictionless checkout system may identify a refined area of interest within the image data generated by the cameras to analyze and identify the product picked up by the shopper and/or confirm that the shopper picked up an item assigned to the location by a planogram.

As part of configuring a frictionless checkout system, the cameras positioned throughout the venue need to be calibrated to ensure that the frictionless checkout system knows the correlation between the pixel location and venue location. Typically, the calibration process involves detecting illumination events at known locations of the venue.

However, conventional pressure mats do not include illumination assemblies. As a result, a venue operator configuring a conventional frictionless checkout system needs to install standalone illumination systems to calibrate the cameras. For example, the venue operator may install shelf-mounted lighting and/or under-shelf illumination systems. These solutions suffer several drawbacks. Notably, these standalone illumination solutions require their own power sources, mounting structures, and/or hardware assemblies that result in a higher cost of operation, longer configuration times, and/or less space available for products.

Accordingly, to overcome at least the aforementioned challenges, there is a need for a dual-mode pressure-sensing and illumination mat.

SUMMARY

In a first embodiment, the present invention is an apparatus comprising (1) a surface that includes a plurality of row wires and a plurality of column wires forming intersection points, wherein intersection points between row wires and column wires include (a) a pressure sensor (i) coupled to the row wire and the column wire at the intersection point and (ii) configured to sense a pressure exerted upon the surface, and (b) a light emitting diode (LED) coupled to the row wire and the column wire at the intersection point in parallel to the pressure sensor; (2) a selector configured to selectively complete an electrical path the flows from a power supply through a selected intersection point; (3) a controller coupled to the selector and configured to control operation of the surface, wherein the controller is configured to operate in one of a pressure-sensing mode or an illumination mode; (4) a switch bank coupled to the controller and the surface, wherein the controller is configured to operate the switch bank in tandem with the selector when operating in the pressure-sensing mode; (5) a resistor bank coupled to the controller and the surface, wherein the controller is configured to operate the resistor bank in tandem with the selector when operating in the illumination mode; and (6) a switch operatively coupled to the controller, wherein (a) when the controller is configured to operate in the pressure-sensing mode, the controller operates the switch such that the switch completes a circuit between the selector, the surface, and the switch bank, and (b) when the controller is configured to operate in the illumination mode, the controller operates the switch such that switch completes a circuit between the selector, the surface, and the resistor bank.

In another embodiment, the present invention is a modular apparatus comprising (1) a first apparatus configured in accordance with the first embodiment and configured to operate as a supervisor apparatus; and (2) a second apparatus configured in accordance with the second apparatus and configured to operate as a subordinate apparatus; wherein the controller of the first apparatus is coupled to the controller of the second apparatus, and the controller of the first apparatus is configured to (a) transmit illumination patterns to the second apparatus, and (b) receive indications of sensed pressure values from the second apparatus.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
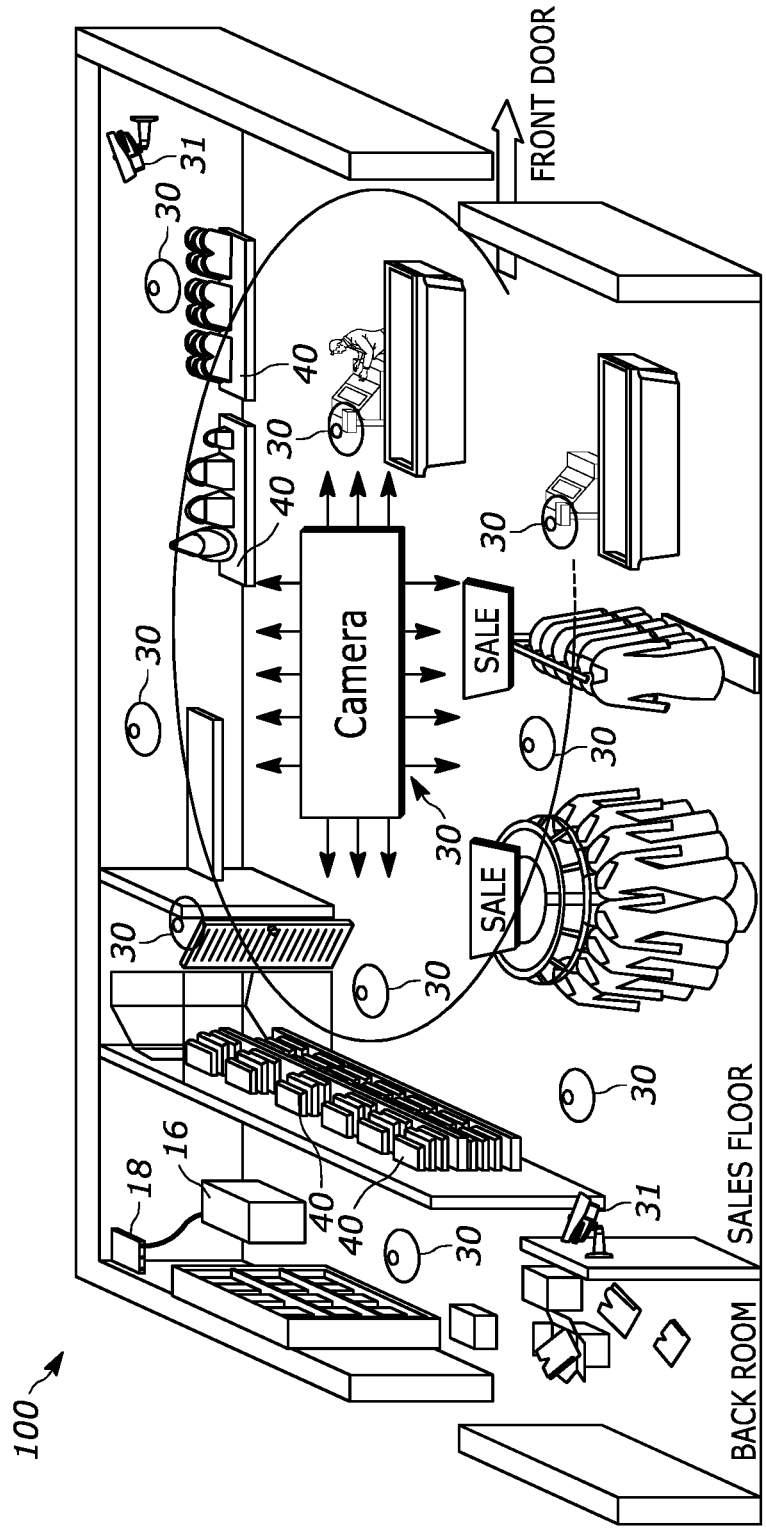
FIG. 1 illustrates a perspective view of an example venue that includes a product monitoring system, as disclosed herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 is a perspective view, as seen from above, of a venue 100 illustrating an arrangement for which a product tracking system (e.g., a frictionless checkout system) within the venue 100 is deployed to facilitate tracking objects within the venue 100. Although the example venue 100 is a retail venue, other types of venues (such as a warehouse, a transport center, an airport, a stadium, a museum, and so on) are envisioned. In the example embodiment of FIG. 1, the venue 100 includes a backroom that has a central controller 16. In other embodiments, the central controller 16 may be located elsewhere on or proximate to the venue 100. The central controller 16 may be operated by venue personnel and/or personnel associated with the RFID system.

The central controller 16 may comprise a networked host computer or server. The central controller 16 may be connected to a plurality of cameras 30, 31 positioned throughout the venue 100 via the network switch 18. For example, the plurality of cameras may include ceiling-mounted cameras 30 and wall-mounted cameras 31. The plurality of cameras 30, 31 may be positioned at a fixed location and/or support pan/tilt/roll control. Additionally, the venue 100 includes a plurality of dual-mode pressure-sensing and illumination mats 40 ("dual-mode mats" or "mats") upon which items are placed. In some embodiments, the venue 100 includes multiple central controllers 16 and/or switches 18 connected to respective subsets of the cameras 30,31 and dual-mode mats 40 associated with the venue 100.

Each of the cameras 30, 31 and dual-mode mats 40 may be in wired or wireless electronic communication with the central controller 16 via the network switch 18 to support data communications therebetween. For example, in some embodiments, the cameras 30, 31 and dual-mode mats 40 may be connected via Category 5 or 6 cables and use the Ethernet standard for wired communications. In other embodiments, the cameras 30, 31 and dual-mode mats 40 may be connected wirelessly, using a built-in wireless transceiver, and may use the IEEE 802.11 (WiFi) and/or Bluetooth standards for wireless communications. Other embodiments may include cameras 30, 31 and dual-mode mats 40 that use a combination of wired and wireless communication.

Figure 2:
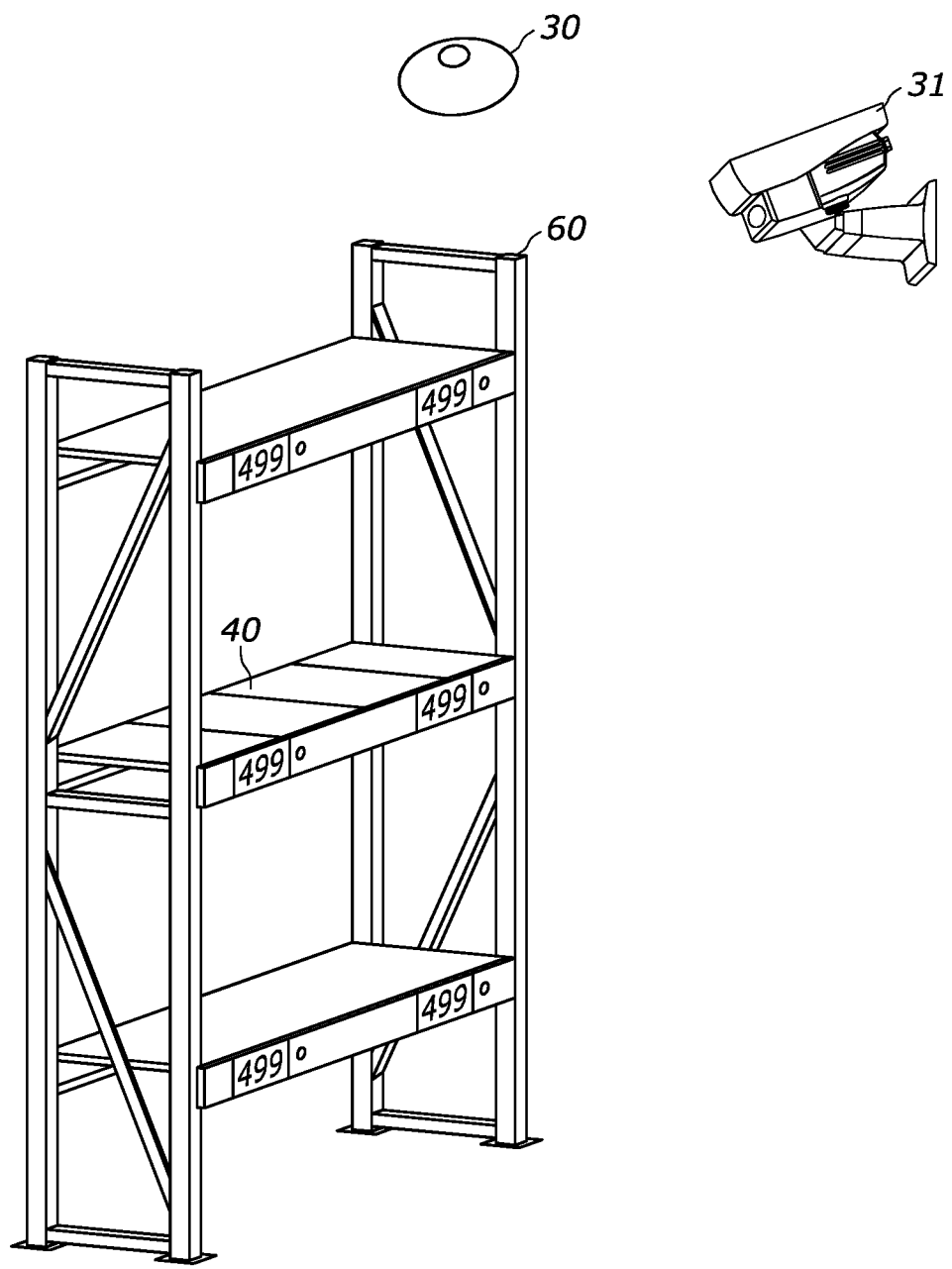
FIG. 2 illustrates a perspective view of a shelf that includes a dual-mode mat being monitored by the product monitoring system, as disclosed herein.

With simultaneous reference to FIG. 2, illustrated is a perspective view of a shelf 60 that includes a dual-mode mat 40 being monitored by the product monitoring system. More particularly, the perspective view depicts a scenario during the initial configuration of the cameras 30, 31 when no products are placed upon the shelf 60. Prior to initiating the configuration process, the central controller 16 may be programmed with position data (e.g., X, Y, and Z coordinates) for the shelf 60, the cameras 30, and/or the mat 40 with respect to the venue 100. For example, the position data associated with the venue may indicate a range of X-Y coordinates associated with the shelf 60, a Z coordinate for the height of each tier, and an arrangement of mats 40 on each tier. In the illustrated scenario, the position data associated with the mat 40 may indicate that the mat 40 is located on the second tier and second position of the shelf 60.

During the configuration, the central controller 16 derives calibration data associated with the cameras 30, 31 based on the known location of the mat 40. For example, the calibration data may indicate a correspondence between positions within the venue 100 and the pixels of image data produced when the cameras 30,31 are configured with particular pan/tilt/roll settings. Accordingly, during operation, when the mat 40 indicates a change in pressure data (e.g., when an object is removed from the dual-mode mat 40), the central controller 16 may compare the current pan/tilt/roll of the cameras 30, 31 to the calibration data to identify cameras that include the location of the mat 40 within the field of view (FOV) and determine which portions (e.g., which pixels) of the images provided by the identified cameras include image data representative of the object.

To initiate the calibration process, the central controller 16 may instruct the mat 40 to illuminate in accordance with a pre-determined illumination pattern. In the illustrated scenario, the illumination pattern is a solid illumination pattern where each light emitting diode (LED) of the mat 40 is illuminated. In other scenarios, the illumination pattern may include a bullseye pattern or other pattern that enables the central controller 16 to identify the position of an individual LED and/or a collection of LEDs of the mat 40 within the image data provided by the cameras 30, 31. In these scenarios, the central controller 16 may derive the calibration data based on the known position the identified LED of the mat 40. As a result, the central controller 16 can calibrate the cameras 30, 31 simultaneously and with greater accuracy than conventionally possible.

It should be appreciated that while the illustrated scenario depicts an initial calibration of the cameras 30, 31 where there are no products on the shelf 60, in other scenarios, similar techniques may be applied after stocking the shelf 60 to re-calibrate the cameras 30, 31. To this end, over time the camera mountings may shift slightly and/or the mechanical components that control the pan/tilt/roll of the camera may change resistivity due to wear and tear. This may cause the calibration data to become inaccurate, thereby requiring recalibration of recalibrate the cameras 30, 31.

In some scenarios, the central controller 16 may initiate a recalibration process when there are products on the shelf 60. In the re-calibration scenario, the central controller 16 may first determine a portion of the mat 40 that is not obscured by the products placed upon the mat 40 and generate an illumination pattern using the unobscured LEDs. As a result, the central controller 16 can recalibrate the cameras 30,31 in a manner that accounts for the dynamic conditions of the venue 100. Additional description of the calibration process is provided in co-pending U.S. application Ser. No. 18/072,534, the entire disclosure of which is hereby incorporated by reference.

Figure 3A:
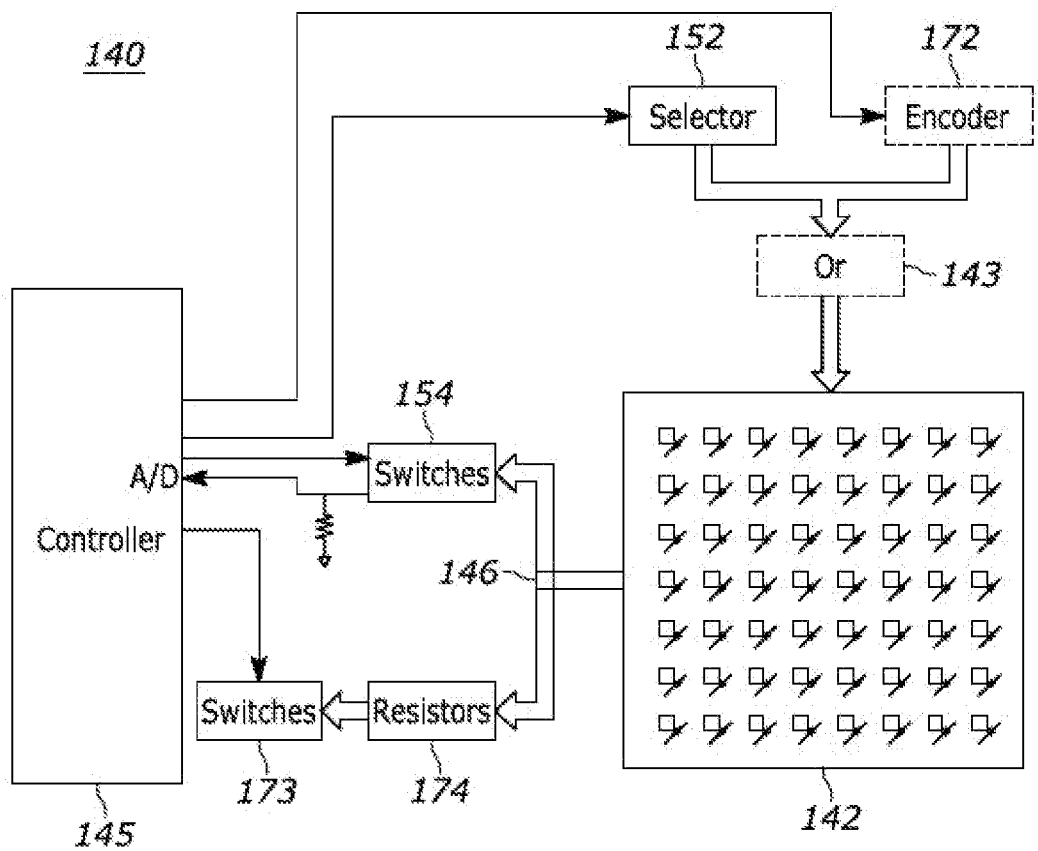
FIG. 3A illustrates an example schematic diagram of a dual-mode mat, as disclosed herein.

FIG. 3A is an example schematic diagram of a dual-mode mat 140 (such as any of the mats 40 described with respect to FIG. 1 or 2) that enables the improved calibration and/or recalibration techniques described herein. As illustrated, the dual-mode mat 140 includes a surface matrix 142. The surface matrix 142 may be a surface upon which items associated with the venue 100 are placed. Additionally, the surface matrix 142 houses a matrix that includes both a pressure sensor and an LED at each matrix position.

The dual-mode mat 140 also includes a selector 152 for selectively controlling which position in the surface matrix 142 is active. To this end, the surface matrix 142 may include a microcontroller (e.g., an Arduino microcontroller)

that includes an input via which selector 152 is electrically connected to the surface mat 142. Accordingly, the selector 152 may be a shift register configured to produce an output analog voltage signal that instructs the microcontroller of the surface matrix 142 which position is active. In response, the microcontroller of the surface matrix 142 completes an electrical path that flows from a power supply through the active position.

Figure 3B:
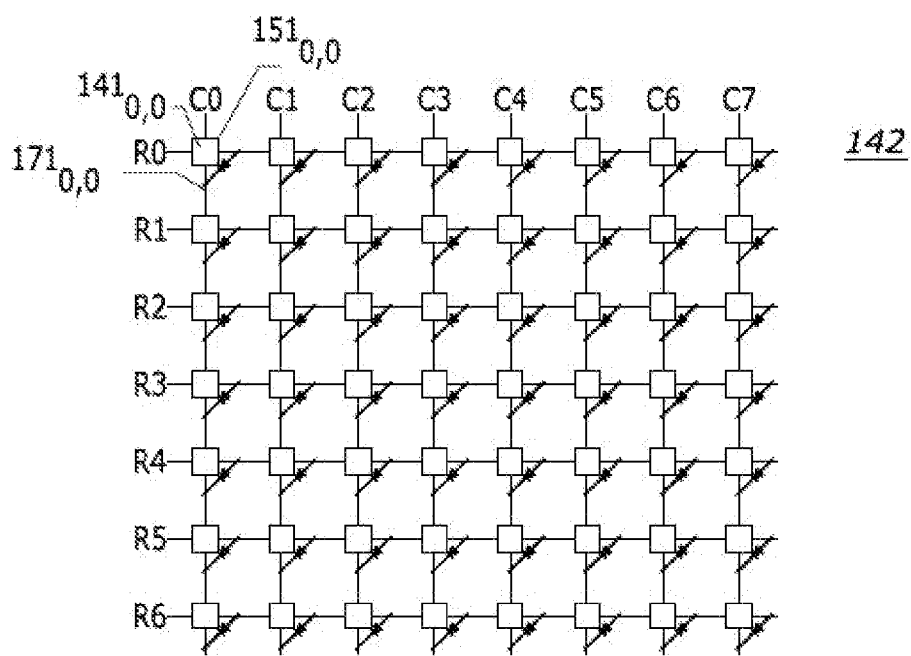
FIG. 3B illustrates an example schematic diagram of a surface matrix included within a dual-mode mat, as disclosed herein.

With simultaneous reference to FIG. 3B, illustrated is an example schematic diagram of the surface matrix 142 of the dual-mode mat 140. The surface matrix 142 may include a plurality of row wires (e.g., R0 to R6) and a plurality of column wires (e.g., C0 to C7). As illustrated, the row wires and the column wires form intersection points 141 that represent the matrix positions of the surface matrix 142. At each intersection point 141, the surface matrix 142 includes a pressure sensor 151 and an LED 171 electrically coupled in parallel to the corresponding row wire and column wire.

In some embodiments, the pressure sensors 151 are high impedance pressure sensors (e.g., pressure sensors having an impedance of approximately 20,000 ohms to approximately 100,000 ohms). Accordingly, when the surface matrix 142 completes the electrical path to the intersection point 141 and runs a current in the forward-biased direction, the LED 171 will have significantly lower impedance than the pressure sensor 151. As a result, the current will mainly flow through the LED 171 causing the LED 171 to illuminate. On the other hand, when the surface matrix 142 completes the electrical path to the intersection point 141 and runs a current in the reverse-biased direction, the LED 171 acts as an open switch, causing the current to flow through the pressure sensor 151. As a result, the pressure sensor 151 may provide an output voltage signal indicative of a pressure exerted on the mat 140. The correspondence between the voltage signal and sensed pressure is typically noted in the product specifications associated with the pressure sensors 151.

During operation, a controller 145 controls the dual-mode mat 140 to operate in either (i) a pressure-sensing mode during which the controller 145 obtains pressure data from the pressure sensors 151, or (ii) an illumination mode during which the LEDs 171 are illuminated in accordance with an illumination pattern. Starting with the pressure-sensing mode, the controller 145 may be configured to control the selector 152 in tandem with a switch bank 154 to scan the outputs of each of the pressure sensors 151 within the surface matrix 142. For example, the controller 145 may maintain a matrix of sensed pressure values corresponding to each of the pressure sensors 151. Accordingly, the controller 145 may configure the selector 152 and the switch bank 154 to complete an electrical path from a power source of the surface matrix 142 through a pre-determined pressure sensor 151 and the switch bank 154 and to an input port of the controller 145. It should be appreciated that the surface matrix 142 may configure the current in the completed circuit to flow in a reverse-biased direction with respect to the LEDs 171 thereby causing the current to flow through the pressure sensors 151. Based on the sensed voltage levels at the input port, the controller 145 may update the pressure values for the scanned pressure sensors 151 in the maintained matrix of pressure values.

When updating the pressure values, the controller 145 may detect a change in pressure that exceeds a threshold value for alerting a central controller (such as the central controller 16 of FIG. 1 or 2). In one example, the threshold is approximately 80% of the maximum resistance of a variable resistor in the pressure sensors 151. For a 3.3V system with pressure sensors that have a maximum resistance of approximately 100,000 ohms, the voltage threshold for detecting a pressure change at the A/D input port of the controller 145 is about 0.66V. If the pressure value reported by a pressure sensor 151 decreased by a threshold amount, then an item was likely removed from the mat 140. On the other hand, if the pressure value reported by a pressure sensor 151 increased by a threshold amount, then an item was likely placed onto the mat 140. In some embodiments, the controller 145 may generate and transmit an event to the central controller 16 that includes an identifier of the mat 140 and/or the particular pressure sensor(s) 151 that exhibited the change in pressure values. The central controller 16 may then query a planogram of the venue 100 to identify a physical location of the mat 140 and/or the identified pressure sensor 151 to obtain image data of the physical location captured by the cameras 30, 31.

Turning to the illumination mode, the controller 145 may be configured to control switches 173 and/or resistor bank 174 to adjust operation of the LEDs 171 of the surface matrix 142 in accordance with an illumination pattern. In some embodiments, the illumination pattern indicates a simple binary or Boolean flag as to whether each of the LEDs 171 should be enabled or disabled. In these embodiments, the controller 145 may instruct the selector 152 to cyclically select the intersection points 141 corresponding the enabled LEDs 171 in the illumination pattern. The microcontroller, in turn, completes an electrical path that flows from a power supply through the intersection point 141 to drive the enabled LEDs 171. It should be appreciated that in the illumination mode, the current flows through the surface matrix 142 in a forward-biased direction with respect to the LEDs 171 thereby by causing the LEDs 171 to illuminate.

In other embodiments, the illumination pattern may include more complex illumination features. As one example, the illumination pattern may indicate an illumination intensity for the LEDs 171. As another example, the LEDs 171 may be multi-color, voltage-variable LEDs that are configurable to generate different colored illumination based on the input voltage. Accordingly, in these embodiments, the illumination pattern may include a color value (e.g., a vector of red, green, and blue values) and/or an intensity value (e.g., a value from 0 to 255).

In these embodiments, a shift register (e.g., the selector 152) may be unable to sufficiently control the LEDs 171. Instead, the mat 140 may include an encoder 172 to encode the intensity and/or color settings of the illumination pattern into control signals for controlling the microcontroller of the surface matrix 142. For example, the encoder 172 may be a TI 74HC4051 or a custom ASIC or FPGA encoder that preferably includes a tri-state output. Accordingly, in these embodiments, the mat 140 may include an OR gate 143 configured to receive the control signals from either the selector 152 or the encoder 172. While the instant disclosure uses a different name to refer to the encoder 172, in these embodiments, the encoder 172 may nonetheless be considered a "selector."

Additionally, the mat 140 includes a resistor bank 174 controlled in tandem with the selector 152 and/or the encoder 172 to control the illumination provided by the enabled LEDs 171. In embodiments that support simple illumination patterns, the controller 145 may set switches in a switch bank 173 to control an overall amount of resistance exhibited by the resistor bank 174 in the circuit between the selector 152, the surface matrix 142 and the resistor bank 174. In particular, the controller 145 may control the switch bank 173 such that the resistance of the resistor bank 174 limits the current of the circuit to be within an operating range of the LEDs 171 and/or below a pre-determined maximum current level.

In embodiments with more complex illumination patterns that indicate an illumination intensity, the resistor bank 174 may include variable gain resistors instead of fixed-gain resistors. Accordingly, the controller 145 may set the resistance of the variable-gain resistors to adjust the current provided to the LEDs 171 to effect the indicated illumination intensity. In some embodiments with illumination patterns that indicate an illumination color, the resistor bank 174 may include a resistor for each of the red, blue, and green channels. Additionally or alternatively, the resistor bank 174 may include one or more controllable switches (e.g., MOSFET transistors) for modulating the resistance in accordance with the color settings. That is, the resistor bank 174 may implement pulse-width modulation (PWM) techniques with a duty cycle configured to change the effective voltage supplied to the LEDs 171. Because the LEDS 171 may be multi-color, voltage variable LEDs, the change in the effective voltage causes the LEDs 171 to change their illumination color. As a result, the controller 145 may control the PWM duty cycle of the resistor bank to implement the color settings of the illumination pattern.

As illustrated, the mat 140 also includes a switch 146. The controller 145 may operate the switch 146 to connect the surface matrix 142 to the switch bank 154 when operating in the pressure-sensing mode and to connect the surface matrix 142 to the resistor bank 174 when operating the illumination mode.

Figure 3C:
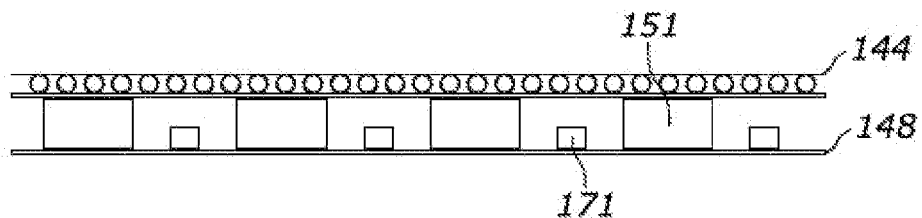
FIG. 3C illustrates a side view of a dual-mode mat, as disclosed herein.

Turning to FIG. 3C, illustrated is a side view of the dual-mode mat 140, as disclosed herein. More particularly, illustrated is a side view of the surface matrix 142 of the dual-mode mat 140.

As illustrated the surface matrix 142 includes a light permeable layer upon 144 upon which items are placed. The light-permeable nature of the layer 144 enables the illumination provided by the LEDs 171 to pass through the layer 144 and be detectable by the cameras 30, 31 of the venue 100. Additionally, the illustrated surface matrix 142 includes a printed circuit board (PCB) 148 upon which the pressure sensors 151 and the LEDs 171 are mounted. The PCB 148 may also include the plurality of row wires and column wires that connect to the pressure sensors 151 and the LEDs 171.

As illustrated, the height of the LEDs 171 is less than the height of the pressure sensors 151 such that the light permeable layer 144 rests upon the pressure sensors 151, and not the LEDs 171. To this end, if the LEDs 171 were to have approximately the same height as the pressure sensors 151, the LEDs 171 would support some of the pressure applied by items placed upon the surface 144 resulting in inaccurate pressure measurements by the pressure sensors 151.

Figure 4A:
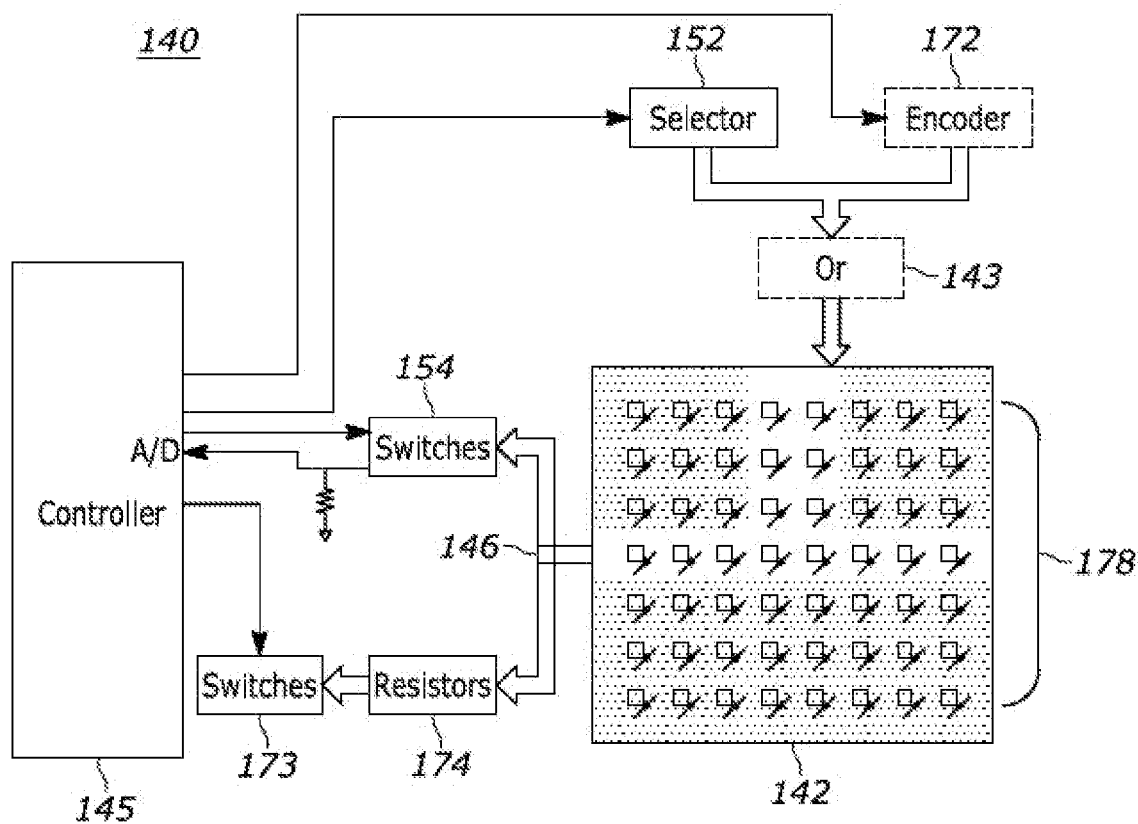
FIG. 4A illustrates an example view of a dual-mode mat being configured to illuminate in accordance with an illumination pattern, as disclosed herein.

FIG. 4A illustrates an example view of the dual-mode mat 140 being configured to illuminate in accordance with an illumination pattern 178, as disclosed herein. As illustrated, the illumination pattern 178 may form three rectangles: an upper left rectangle, an upper right rectangle, and a lower rectangle.

Figures 4B, 5A:
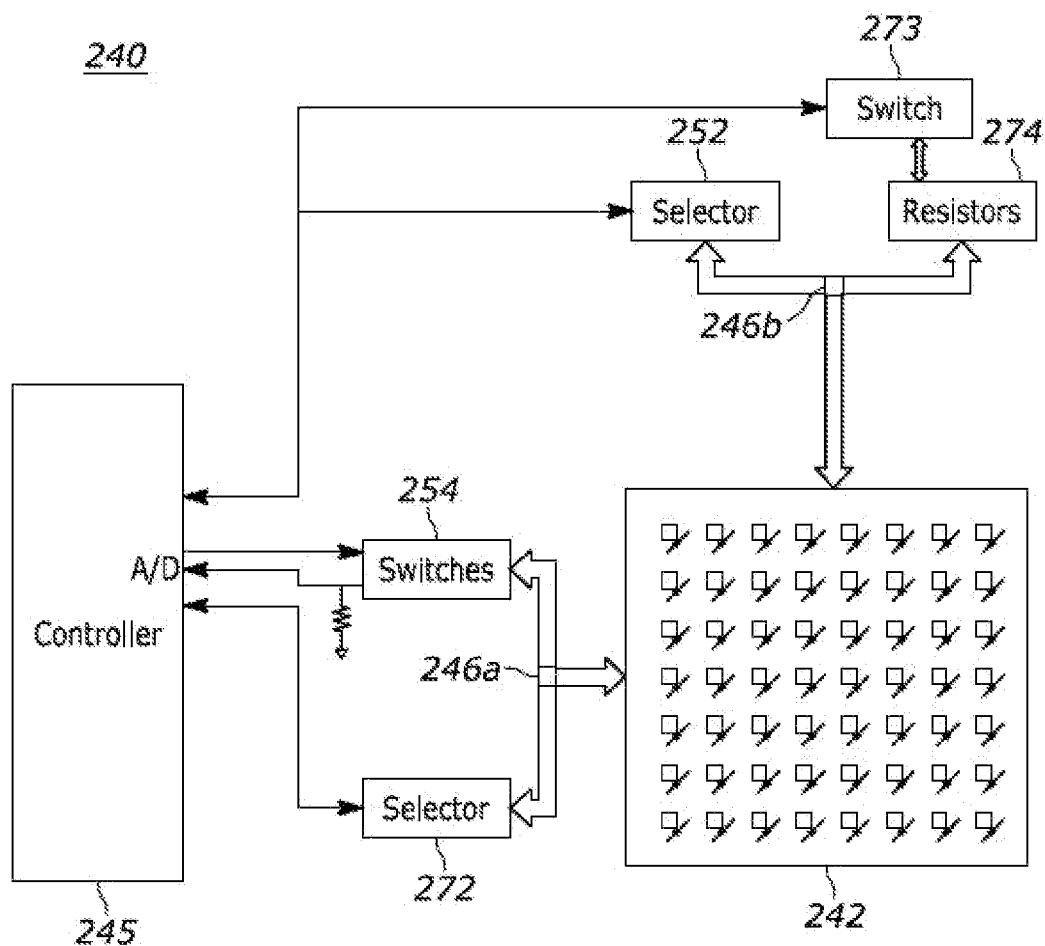
FIG. 4B illustrates an example data structure for an illumination pattern, as disclosed herein.
FIG. 5A illustrates an example schematic diagram of an alternate embodiment of a dual-mode mat, as disclosed herein.

With simultaneous reference to FIG. 4B, illustrated is an example data structure for the illumination pattern 178. As illustrated, the data structure for the illumination pattern 178 may be a matrix of values that correspond to the LEDs 171 of the surface matrix 142 in a 1:1 relationship. For example, matrix position (0,0) of the data structure may correspond to the LED $171_{0,0}$. Accordingly, to cause the LEDs 171 to illuminate in accordance with the illumination pattern 178, the controller 145 may analyze the illumination pattern 178 to identify the illumination settings for each of the LEDs 171 and configure the selection 152 and/or the encoder 172 to control the surface matrix 142 in accordance therewith. More particularly, the controller 145 may configure the resistor bank 174 and the switches 173 in accordance with the illumination settings indicated by the illumination pattern 178.

In the illustrated example, the illumination pattern 178 represents a single-color illumination pattern. Accordingly, each matrix position only corresponds to a single value—illumination intensity. In alternate embodiments that include multi-color illumination patterns, each matrix position may include a vector of values that correspond to a red intensity value, a green intensity value, and a blue intensity value to use when configuring the resistance of the red, green, and blue channel resistors of the resistor bank 174. In still other embodiments, the matrix position may include a binary or Boolean variable indicating whether the LED 171 at the corresponding position 141 is to be enabled or not.

As disclosed herein, the controller 145 may store the illumination pattern 178 in a memory. For example, the controller 145 may have received the illumination pattern 178 from the central controller 16. In some embodiments, the controller 145 stores multiple illumination patterns in the memory. To this end, different illumination patterns may be designed for different purposes. For example, a first illumination pattern may be designed to facilitate a camera calibration process and a second illumination pattern may be designed to facilitate an assisted restocking application. Additionally, in some embodiments, the controller 145 may dynamically generate and store an illumination pattern based upon pressure data sensed during the pressure-sensing mode.

Figure 5B:
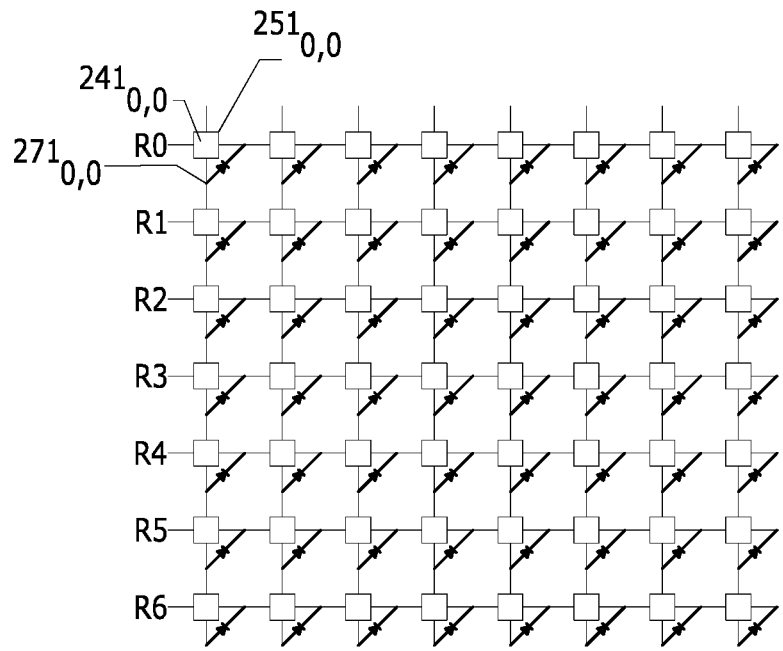
FIG. 5B illustrates an example diagram of a surface matrix included within the alternate embodiment of a dual-mode mat, as disclosed herein.

FIG. 5A illustrates an example schematic diagram of an alternate embodiment for a dual-mode mat 240, as disclosed herein. With simultaneous reference to FIG. 5B, illustrated is an example diagram of a surface matrix 242 included within the alternate embodiment of the dual-mode mat 240.

As illustrated, the LEDs 271 at each intersection point 241 in the surface matrix 242 are coupled in parallel to the pressure sensors 251 and biased in the opposite direction as the LEDs 171 of the sensor matrix 142. As such, the direction of current flowing through the sensor matrix 242 has the opposite effect as the sensor matrix 142. That is, the forward-biased direction of current in the surface matrix 142 is the reverse-biased direction of current in the surface matrix 242. Similarly, the reverse-biased direction of current in the surface matrix 142 is the forward-biased direction of current in the surface matrix 242. As a result, the current flow for the illumination mode flows in the opposite directions for the dual-mode mat 240.

Accordingly, as shown in FIG. 5A, the illumination mode circuitry is arranged in the opposite direction as the corresponding components of the dual-mode mat 140 to maintain their circuit position with respect to the forward direction of bias of the LEDs 271. That is, the selector 272 for the illumination mode in the mat 240 is positioned to the left of surface matrix 242; whereas the selector 152 for the illumination mode in the mat 140 is positioned above the surface matrix 142. Similarly, the resistor bank 274 and the corresponding switch bank 273 of the mat 240 are positioned on the upper side of the surface matrix 242 whereas the resistor bank 174 and switch bank 173 of the mat 140 are positioned to the left of the surface matrix 142. It should be appreciated that while the dual-mode mat 140 may use the selector 152 for both the pressure-sensing mode and the illumination mode, the dual mode mat 240 includes the selector 272 (and/or encoder) for the illumination mode in addition to the selector 252 for the pressure-sensing mode.

It should be appreciated that despite the illumination mode components of the dual-mode mat 240 being positioned in a different location to account for the different direction of bias of the LEDs 271, the components of the dual-mode mat 240 may generally function in an equivalent manner as their corresponding component of the dual-mode mat 140. That said, because the dual-mode mat 240 includes different selectors for the illumination mode and the pressure-sensing mode, the dual-mode mat 240 includes switches 246a-b on both sides of the surface matrix 242 such that the controller 245 operates in tandem when switching between the pressure-sensing mode and the illumination mode. It should be appreciated that the switches 256a-b may include multiple physical switches such that the switches 256a-b can process tri-state inputs to the surface matrix 242.

Figure 6:
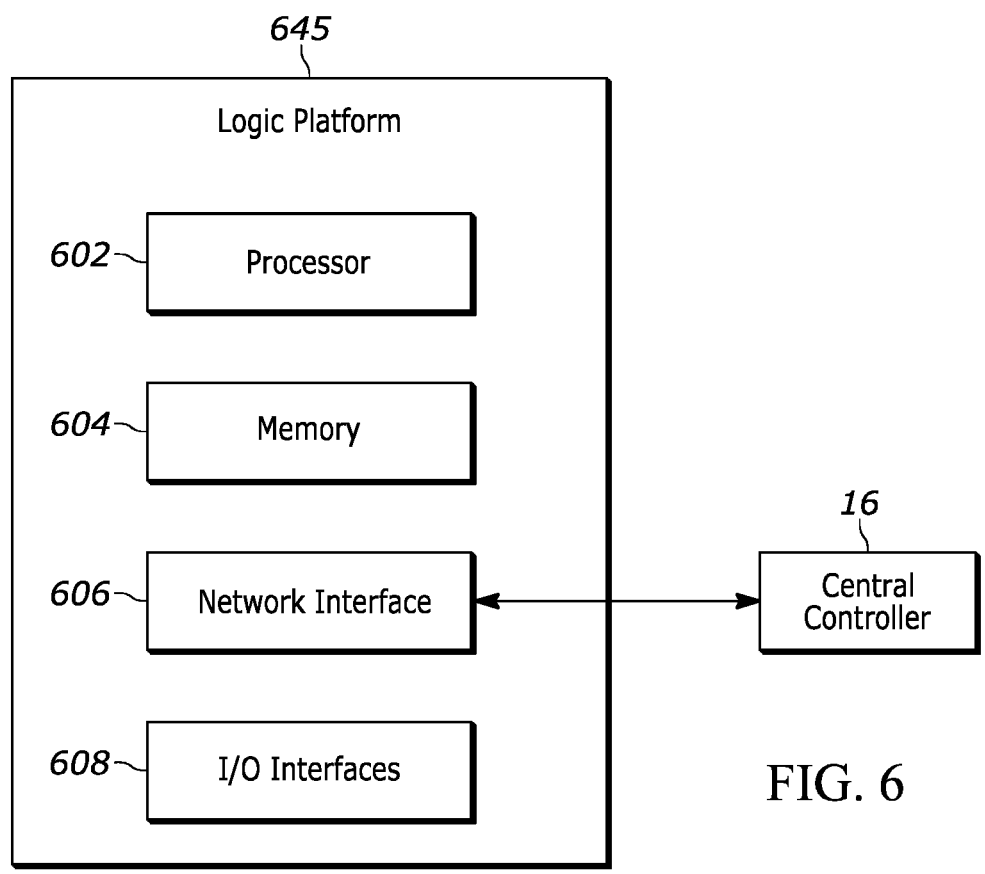
FIG. 6 is a block diagram representative of a controller of a dual-mode mat and the various components thereof.

FIG. 6 is a block diagram representative of a controller 645 of a dual-mode mat (such as the dual-mode mats 40, 140, 240) and the various components thereof. The controller 645 is represented as a logic platform that functions as a processing platform capable of executing instructions to, for example, implement functionality of the example systems described herein (including functionality described with respect to the controllers 145, 245). Example processing platforms include, for example, implementing operations of the example methods described herein via field programmable gate arrays (FPGAs) and application specific integrated circuits (ASICs).

The controller 645 includes a processor 602 that includes a processor such as, for example, one or more microprocessors, controllers, and/or any suitable type of processor. The controller 645 includes memory (e.g., volatile memory, non-volatile memory) 604 accessible by the processor 602 (e.g., via a memory controller). The example processor 602 interacts with the memory 604 to obtain, for example, machine-readable instructions stored in the memory 604 corresponding to, for example, the controller functionality described throughout this disclosure. Additionally or alternatively, machine-readable instructions corresponding to the example operations described herein may be stored on one or more removable media (e.g., a compact disc, a digital versatile disc, removable flash memory, etc.) that may be coupled to the controller 645 to provide access to the machine-readable instructions stored thereon. In some embodiments, the memory 604 maintains one or more data structures representative of illumination patterns and/or a matrix of current pressure values sensed by the pressure sensors of a surface matrix (such as the surface matrices 142, 242).

The controller 645 also includes a network interface 606 to enable communication with other machines (e.g., the central controller 16 and/or other dual-mode mats) via, for example, one or more networks. The example network interface 606 includes any suitable type of communication interface(s) (e.g., wired and/or wireless interfaces) configured to operate in accordance with any suitable protocol(s). For example, the network interface 606 may include a first set of transceivers for communications with the central controller 16 and a second set of transceivers for communicating with other dual-mode mats.

In some embodiments, the controller 645 may transmit pressure data obtained during the pressure-sensing mode to the central controller 16. For example, as described above, during the pressure-sensing mode, the controller 645 may scan the pressure sensors of a surface matrix. If the pressure value reported by any of the pressure sensors has changed by a threshold amount from the value maintained in the memory 604, then the controller 645 may generate a pressure change event to transmit to the central controller 16. The pressure change event may indicate a time stamp associated with the pressure data, an identifier of the pressure sensor (e.g., an identifier that indicates a position of the pressure sensor within the surface matrix), an identifier of the controller 645, and/or whether the change in pressure is an increase or a decrease in pressure.

Additionally, the controller 645 may be configured to receive illumination patterns from the central controller 16. For example, the central controller 16 may transmit an illumination pattern to the controller 645 for storage in the memory 604. When the central controller 16 instructs the controller 645 to operate in the illumination mode, the controller 645 may obtained the stored illumination pattern and control the LEDs of the surface matrix to illuminate in accordance therewith.

The controller 645 also includes I/O interfaces 608 to enable receipt of user input and communication of output data to the user.

Embodiments of a Dual-Mode Mat

Embodiments of a dual-mode mat (such as the dual-mode mats 40, 140, 240) disclosed herein include a surface (such as the surface matrices 142, 242) that includes a plurality of row wires and a plurality of column wires forming intersection points (such as intersection points 141, 241). The intersection points between row wires and column wires include a pressure sensor (such as a pressure sensor 151, 251) (i) coupled to the row wire and the column wire at the intersection point and (ii) configured to sense a pressure exerted upon the surface, and a light emitting diode (LED) (such as the LEDs 171, 271) coupled to the row wire and the column wire at the intersection point in parallel to the pressure sensor. In some embodiments, the pressure sensors have an impedance from about 20,000 ohms to about 100,000 ohms.

In some embodiments, the surface includes a first, light-permeable layer (such as the layer 144) upon which objects are placed and a second layer (such as the layer 148) that includes a printed circuit board to which the pressure sensors and LEDs are coupled.

The dual-mode mat also includes a selector (such as the selectors 152, 252, 272 and the encoder 172) configured to selectively complete an electrical path the flows from a power supply through a selected intersection point. For example, the selector may be a shift register. It should be appreciated in some embodiments, such as the embodiment depicted in FIG. 5A, the selector may include multiple component selectors.

The dual-mode mat also includes a controller (such as the controllers 145, 245, 645) coupled to the selector and configured to control operation of the surface. The controller may be configured to operate in one of a pressure-sensing mode or an illumination mode.

The dual-mode mat also includes a switch bank (such as the switch banks 154, 254) coupled to the controller and the surface, wherein the controller is configured to operate the switch bank in tandem with the selector when operating in the pressure-sensing mode.

The dual-mode mat also includes a resistor bank (such as the resistor banks 174, 274) coupled to the controller and the surface, wherein the controller is configured to operate the resistor bank in tandem with the selector when operating in the illumination mode.

The dual-mode mat also includes a switch (such as the switches 146, 246a, 246b) operatively coupled to the controller, wherein (i) when the controller is configured to operate in the pressure-sensing mode, the controller operates the switch such that the switch completes a circuit between the selector, the surface, and the switch bank, and (ii) when the controller is configured to operate in the illumination mode, the controller operates the switch such that switch completes a circuit between the selector, the surface, and the resistor bank. It should be appreciated that in some embodiments, such as the embodiment depicted in FIG. 5A, the switch may include multiple component switches.

In some embodiments, to control operation of the surface in the illumination mode, the controller is configured to configure current flowing through the electrical path to the selected intersection point to flow in a first direction such that the LED is forward-biased. Similarly, to control operation of the surface in the pressure-sensing mode, the controller is configured to configure current flowing through the electrical path to the selected intersection point to flow in a first direction such that the LED is reverse-biased. It should be appreciated that the first and second directions may vary depending upon the orientation of the LEDs of the surface. For example, the "first direction" of the surface 142 is a different direction as the "first direction" of the surface 242.

In some embodiments, to control operation of the surface in the illumination mode, the controller is configured to obtain, from a memory (such as the memory 604) of the controller, an illumination pattern that indicates one or more intersection points at which the LED is to be illuminated. The controller may then control the selector in accordance with the illumination pattern by causing the selector to cyclically select the indicated intersection points.

In some embodiments, the illumination pattern indicates an illumination intensity for the one or more illuminated intersection points. In these embodiments, the controller configures operation of the resistor bank in accordance with the indicated illumination intensities such that when the illuminated intersection points are selected by the selector, the LEDs of the illuminated intersection points are illuminated based on the indicated intensities. It should be appreciated that the indicated intensity may not represent an actual intensity unit of measurement (e.g., candelas) but a factor by which a maximum intensity of the LED is scaled. For example, if the illumination intensity values use a scale from 0 to 255, the illumination intensity may indicate a numerator of a fraction having 256 as the denominator. The controller may then scale the illumination intensity of the LED based on the resulting fraction.

In some embodiments where the LEDs are multi-color, voltage-variable LEDs, the illumination pattern indicates a color for the one or more illuminated intersection points. In these embodiments, the controller configures operation of the resistor bank in accordance with the indicated illumination colors such that when the illuminated intersection points are selected by the selector, the LEDs of the illuminated intersection points are illuminated in the indicated colors.

In some embodiments, to control operation of the surface in the pressure-sensing mode, the controller is configured to (i) control the selector to cyclically select the intersection points; (ii) configure the switch bank to complete an electrical path from the pressure sensor to an input terminal of the controller; and (iii) obtain a pressure value at the selected intersection point based upon a voltage level detected at the input terminal of the controller.

In some embodiments, the controller additionally comprises one or more transceivers (such as the network interface 606) coupled to one or more remote computing systems. In these embodiments, the one or more transceivers may be coupled to a central controller (such as the central controller 16). For example, the controller may be configured to receive illumination patterns (such as the illumination pattern 178) from central controller, and transmit indications of sensed pressure values to the central controller.

Modular Arrangement of Dual-Mode Mats

As shown in FIG. 2, the shelf 60 may include multiple dual-mode mats 40 on a tier. In the illustrated example, the second tier includes four dual-mode mats 40. In many embodiments, the dual-mode mats 40 communicate with the central server 16 via an IEEE 802.11 (Wi-Fi) communication link. For each of the dual-mode mats 40 to directly communicate with the central controller 16 in the above-described manner, then each of the dual-mode mats 40 would need to include the corresponding Wi-Fi communication components, adding additional cost and size to each dual-mode mat 40.

Accordingly, techniques described herein relate to connecting multiple dual-mode mats in a modular arrangement of supervisor nodes and subordinate nodes. In these arrangements, only the supervisor nodes may include the Wi-Fi circuitry for communication with the central controller 16. As a result, the more numerous subordinate nodes may be constructed at a lower cost. Additionally, the subordinate nodes may have a smaller form factor for the control components thereby enabling additional items to be placed on the surfaces thereof.

Figure 7:
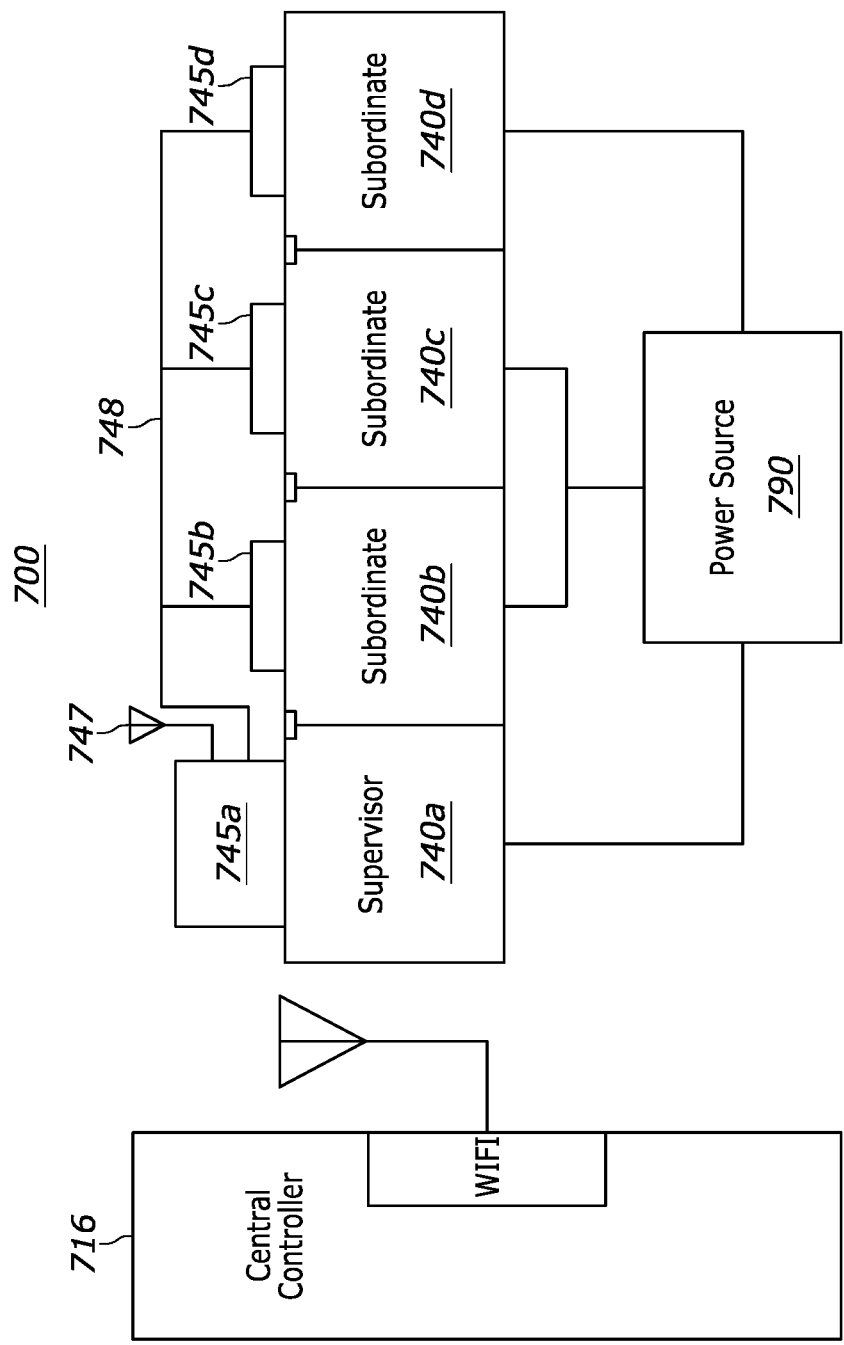
FIG. 7 illustrates a modular arrangement of dual-mode mats coupled via a communication bus, in accordance with techniques described herein.

FIG. 7 illustrates a modular arrangement 700 of dual-mode mats 740 coupled via a communication bus 748, in accordance with techniques described herein. For example, the four mats 740 may correspond to the four mats on the second tier of the shelf 60 of FIG. 2.

As illustrated, the mats 740 include a supervisor node 740a and three subordinate nodes 740b-d. Each of the dual-mode mats 740 may be configured in a similar manner as the dual-mode mats 40, 140, and 240. However, unlike the subordinate nodes 740b-d, the controller 745a of the supervisor node 740a includes a wireless transceiver 747 for communication with a central controller 716 (such as the central controller 16).

Instead, the controllers 745b-d of the subordinate nodes are configured to communicate over a communication bus 748. The communication bus 748 may implement any suitable bus communication protocol, including proprietary bus communication protocols. Additionally, the controller 745a of the supervisor node 740a is also coupled to the communication bus 748. Accordingly, the supervisor node 740a may act as a relay between the central controller 716 and the subordinate nodes 740b-d.

As one example, the central controller 716 may transmit an illumination pattern for the subordinate node 740c to the supervisor node 740a over a Wi-Fi network. In this example, the supervisor node 740a may then transmit an instruction over the communication bus 748 instructing the subordinate node 740c to store the received illumination pattern in a memory thereat. In some embodiments, when the subordinate node 740c receives the illumination pattern over the communication bus 748 the controller 745c of the subordinate node 740c may begin operating in the illumination mode. In other embodiments, the subordinate node 740c may simple store the illumination pattern in the memory and await further instruction before operating in the illumination mode.

As another example, when operating in the pressure-sensing mode, the controllers 745b-d of the subordinate nodes 740*b-d* may continuously scan their respective pressure sensors to determine if a change in pressure value exceeds a threshold amount. Accordingly, when a controller 745*b-d* detects that a pressure value changed by a threshold amount, the controller 745*b-d* may generate and transmit a pressure change event over the communication bus 748. The pressure change event may indicate a time stamp associated with the pressure data, an identifier of the pressure sensor (e.g., an identifier that indicates a position of the pressure sensor within the surface matrix), an identifier of the controller 745*b-d*, and/or whether the change in pressure is an increase or a decrease in pressure. As such, the pressure change event may be considered an indication of sensed pressure values. The controller 745*a* of the supervisor node 740*a* may detect that a pressure change event was written to the communication bus 748 and transmit the event to the central controller 716 via the Wi-Fi network.

Additionally, each of the dual-mode mats 740*a-d* may share a common power source 790. In some embodiments, the power source 790 includes an energy harvester for generating the power. For example, the power source 790 may include a solar, thermal, radio frequency (RF), and/or piezoelectric energy harvester. In addition to the energy harvester, the power source 790 may include a fallback DC power source.

Figure 8:
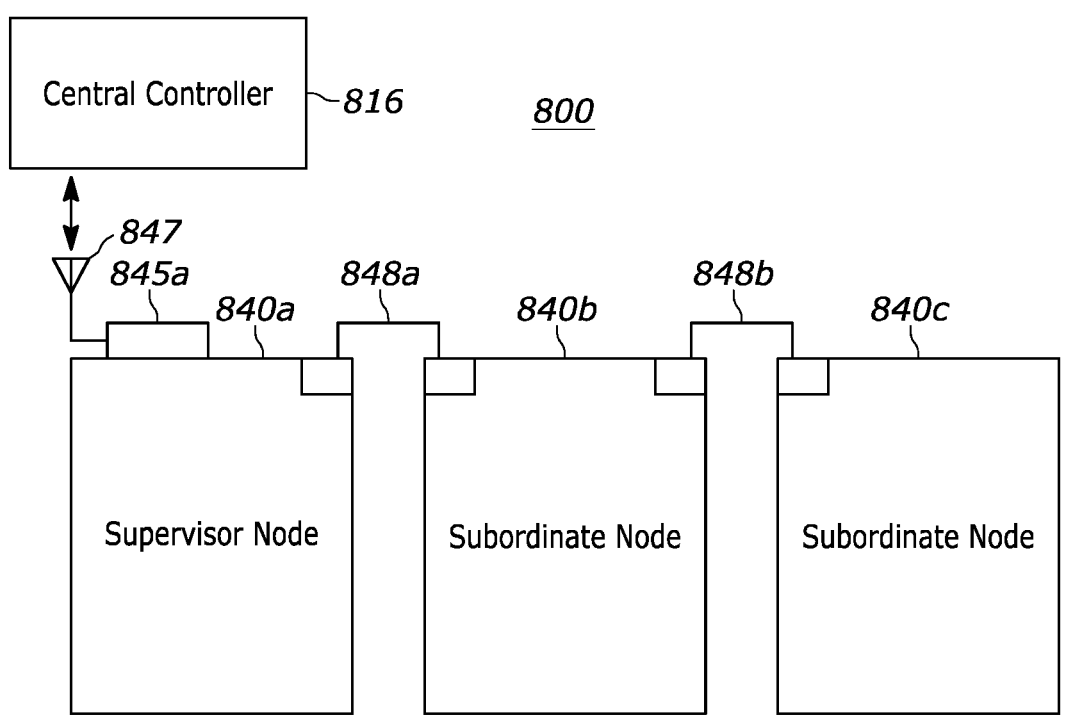
FIG. 8 illustrates a modular arrangement of dual-mode mats coupled via a daisy chain arrangement, in accordance with techniques described herein.

FIG. 8 illustrates an alternate modular arrangement of dual-mode mats 840 coupled via a daisy chain arrangement, in accordance with techniques described herein. The dual-mode mats 840*a-c* may be configured in a similar manner as the dual-mode mats 740*a-c*. That is, the supervisor node 840*a* acts a relay between the central controller 816 and the subordinate node 840*b-c*.

However, rather than relaying the communications over the communication bus 748, the modular arrangement 800 includes a daisy chain of direct communicative couplings between the dual-mode mats 840. That is, the supervisor node 840*a* is coupled to the subordinate node 840*b* via the direct coupling 848*a* and the subordinate node 840*b* is coupled to the subordinate node 840*c* via the direct coupling 848*b*. Accordingly, if the controller of the subordinate node 840*c* detects a change in pressure, the controller sends the pressure change event to the subordinate node 840*b* via the direct coupling 848*b*, which relays the pressure change event to the supervisor node 840*a* via the direct coupling 848*a*, which relays the pressure change event to the central controller 816 via the Wi-Fi connection facilitated by the Wi-Fi transceiver 847. Similarly, if the central controller 816 wants to send an illumination pattern to the subordinate node 840*c*, the central controller 816 sends the illumination pattern to the supervisor node 840*a* via the Wi-Fi connection facilitated by the Wi-Fi transceiver 847, which relays the illumination pattern to the subordinate node 840*b* via the direct coupling 848*a*, which relays the illumination pattern to the subordinate node 840*c* via the direct coupling 848*b*.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions.

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed:

1. An apparatus comprising:
   a surface that includes a plurality of row wires and a plurality of column wires forming intersection points, wherein intersection points between row wires and column wires include:
      a pressure sensor (i) coupled to the row wire and the column wire at the intersection point and (ii) configured to sense a pressure exerted upon the surface, and
      a light emitting diode (LED) coupled to the row wire and the column wire at the intersection point in parallel to the pressure sensor;
   a selector configured to selectively complete an electrical path the flows from a power supply through a selected intersection point;
   a controller coupled to the selector and configured to control operation of the surface, wherein the controller is configured to operate in one of a pressure-sensing mode or an illumination mode;
   a switch bank coupled to the controller and the surface, wherein the controller is configured to operate the switch bank in tandem with the selector when operating in the pressure-sensing mode;
   a resistor bank coupled to the controller and the surface, wherein the controller is configured to operate the resistor bank in tandem with the selector when operating in the illumination mode; and
   a switch operatively coupled to the controller, wherein:
      when the controller is configured to operate in the pressure-sensing mode, the controller operates the switch such that the switch completes a circuit between the selector, the surface, and the switch bank, and
      when the controller is configured to operate in the illumination mode, the controller operates the switch such that switch completes a circuit between the selector, the surface, and the resistor bank.

2. The apparatus of claim 1, wherein the surface includes a first, light-permeable layer upon which objects are placed and a second layer that includes a printed circuit board to which the pressure sensors and LEDs are coupled.

3. The apparatus of claim 1, wherein the pressure sensor has an impedance from about 20,000 ohms to about 100,000 ohms.

4. The apparatus of claim 1, wherein to control operation of the surface in the illumination mode, the controller is configured to:
   configure current flowing through the electrical path to the selected intersection point to flow in a first direction such that the LED is forward-biased.

5. The apparatus of claim 4, wherein to control operation of the surface in the illumination mode, the controller is configured to
   obtain, from a memory of the controller, an illumination pattern that indicates one or more intersection points at which the LED is to be illuminated; and
   control the selector in accordance with the illumination pattern by causing the selector to cyclically select the indicated intersection points.

6. The apparatus of claim 5, wherein:
   the illumination pattern indicates an illumination intensity for the one or more illuminated intersection points, and
   to control operation of the surface in the illumination mode, the controller is configured to:
      configure operation of the resistor bank in accordance with the indicated illumination intensities such that when the illuminated intersection points are selected by the selector, the LEDs of the illuminated intersection points are illuminated at the indicated intensities.

7. The apparatus of claim 5, wherein:
   the LEDs are multi-color, voltage-variable LEDs;
   the illumination pattern indicates a color for the one or more illuminated intersection points, and
   to control operation of the mat surface in the illumination mode, the controller is configured to:
      configure operation of the resistor bank in accordance with the indicated illumination colors such that when the illuminated intersection points are selected by the selector, the LEDs of the illuminated intersection points are illuminated in the indicated colors.

8. The apparatus of claim 3, wherein to control operation of the surface in the pressure-sensing mode, the controller is configured to:

configure current flowing through the electrical path to the selected intersection point to flow in a first direction such that the LED is reverse-biased.

9. The apparatus of claim 8, wherein to control operation of the surface in the pressure-sensing mode, the controller is configured to
control the selector to cyclically select the intersection points;
configure the switch bank to complete an electrical path from the pressure sensor to an input terminal of the controller; and
obtain a pressure value at the selected intersection point based upon a voltage level detected at the input terminal of the controller.

10. The apparatus of claim 1, wherein the controller comprises:
one or more transceivers coupled to one or more remote computing systems.

11. The apparatus of claim 10, wherein:
the one or more transceivers are coupled with a central controller; and
the controller is configured to:
receive illumination patterns from central controller, and
transmit indications of sensed pressure values to the central controller.

12. A modular apparatus comprising:
a first apparatus of claim 1 configured to operate as a supervisor apparatus; and
a second apparatus of claim 1 configured to operate as a subordinate apparatus;
wherein:
the controller of the first apparatus is coupled to the controller of the second apparatus, and
the controller of the first apparatus is configured to:
transmit illumination patterns to the second apparatus, and
receive indications of sensed pressure values from the second apparatus.

13. The modular apparatus of claim 12, further comprising
a third apparatus of claim 10 configured to operate as a subordinate apparatus.

14. The modular apparatus of claim 13, further comprising:
a communication bus via which the controller of the first apparatus, the controller of the second apparatus, and the controller of the third apparatus are communicatively coupled.

15. The modular apparatus of claim 14, wherein the controller of the first apparatus is configured to:
transmit illumination patterns to the second apparatus and the third apparatus via the communication bus, and
receive indications of sensed pressure values from the second apparatus and the third illuminated mat apparatus via the communication bus.

16. The modular apparatus of claim 13, wherein:
the controller of the second illuminated mat apparatus is configured to:
transmit illumination patterns to the third apparatus, and
receive indications of sensed pressure values from the third apparatus.

17. The modular apparatus of claim 16, wherein:
the controller of the second apparatus is configured to:
relay (i) illumination patterns received from the first apparatus to the third apparatus, and (ii) indications of sensed pressure values received from the third apparatus to the first apparatus.

18. The modular apparatus of claim 12, wherein the controller is:
communicatively coupled with a central controller; and
configured to:
receive illumination patterns from central controller, and
transmit indications of sensed pressure values to the central controller.

19. The modular apparatus of claim 18, wherein the received illumination patterns include the illumination patterns transmitted to the second apparatus.

20. The modular apparatus of claim 18, wherein the transmitted indications of sensed pressure values include the indications of sensed pressure values received from the second apparatus.

* * * * *